(12) United States Patent
Park et al.

(10) Patent No.: US 7,986,423 B2
(45) Date of Patent: Jul. 26, 2011

(54) IMAGE REPRINTING APPARATUS AND METHOD

(75) Inventors: Ji-sub Park, Suwon-si (KR); Hun-hee Yun, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 2058 days.

(21) Appl. No.: 10/958,739

(22) Filed: Oct. 6, 2004

(65) Prior Publication Data

US 2005/0254088 A1   Nov. 17, 2005

(30) Foreign Application Priority Data

May 14, 2004 (KR) .......................... 10-2004-0034382
Jul. 27, 2004 (KR) .......................... 10-2004-0058847

(51) Int. Cl.
*G06F 3/12* (2006.01)
(52) U.S. Cl. ....... 358/1.15; 358/1.9; 358/1.16; 358/488; 348/207.2; 709/222; 707/204
(58) Field of Classification Search .................. 358/1.15, 358/474, 1.16, 449, 486, 488, 497; 348/207.2; 709/222, 223; 707/204, 10.205, 102
See application file for complete search history.

(56) References Cited

U.S. PATENT DOCUMENTS

| | | | | |
|---|---|---|---|---|
| 4,918,537 A | * | 4/1990 | Mori et al. ..................... | 358/300 |
| 5,303,334 A | * | 4/1994 | Snyder et al. .................. | 358/1.9 |
| 5,825,467 A | * | 10/1998 | Narita ............................ | 355/40 |
| 6,070,146 A | * | 5/2000 | Mimata ........................... | 705/13 |
| 6,219,129 B1 | * | 4/2001 | Kinjo et al. ..................... | 355/40 |
| 6,628,313 B1 | * | 9/2003 | Minakuchi et al. ............. | 715/853 |
| 6,724,502 B1 | * | 4/2004 | Miyake et al. .................. | 358/474 |
| 6,819,359 B1 | * | 11/2004 | Oda ................................. | 348/247 |
| 6,886,020 B1 | * | 4/2005 | Zahavi et al. ................... | 707/204 |
| 6,938,057 B2 | * | 8/2005 | Gusler et al. ................... | 707/204 |
| 6,954,284 B2 | * | 10/2005 | Enomoto ........................ | 358/1.18 |
| 7,012,715 B2 | * | 3/2006 | Yamaguchi ..................... | 358/1.9 |
| 7,013,386 B2 | * | 3/2006 | Nomoto .......................... | 713/153 |
| 7,145,679 B2 | * | 12/2006 | Hitaka ............................ | 358/1.15 |

(Continued)

FOREIGN PATENT DOCUMENTS

JP   11-232059   8/1999

(Continued)

OTHER PUBLICATIONS

Office Action dated Jan. 25, 2006 of Korean Patent Application No. 10-2004-0058847.

*Primary Examiner* — Negussie Worku
(74) *Attorney, Agent, or Firm* — Stanzione & Kim, LLP

(57) ABSTRACT

An image reprinting apparatus and method thereof. The apparatus includes an image-processing information storage unit storing processing information of an image when the image is processed, a print history search unit searching the image-processing information storage unit to determine whether an input image has been printed before, a display unit processing the input image based on previous processing information of the input image if the print history search unit determines that the input image has been printed before and displaying the processed image, and an image-printing unit printing the displayed image. In the reprinting apparatus, information regarding the processing of an image that has been printed before is stored. When a user desires to reprint the image, the user can reprint the image without reprocessing the image, which enhances user convenience.

33 Claims, 8 Drawing Sheets

U.S. PATENT DOCUMENTS

| | | | |
|---|---|---|---|
| 7,268,904 B2 * | 9/2007 | Matsumoto | 358/1.15 |
| 7,539,706 B1 * | 5/2009 | Campbell | 707/204 |
| 7,595,903 B2 * | 9/2009 | Kizaki et al. | 358/1.15 |
| 7,684,069 B2 * | 3/2010 | Kashiwazaki | 358/1.15 |
| 7,796,282 B2 * | 9/2010 | Yamakawa | 358/1.14 |
| 2001/0006423 A1 | 7/2001 | Subramaniam | |
| 2003/0011801 A1 | 1/2003 | Simpson | |
| 2003/0154395 A1 * | 8/2003 | Miura et al. | 713/200 |
| 2004/0021708 A1 * | 2/2004 | Lay et al. | 347/5 |
| 2004/0041913 A1 * | 3/2004 | Takasumi et al. | 348/207.2 |
| 2004/0061876 A1 * | 4/2004 | Iida | 358/1.5 |
| 2004/0158661 A1 * | 8/2004 | Mokuya | 710/72 |
| 2004/0189959 A1 * | 9/2004 | Kito | 355/40 |
| 2004/0190057 A1 * | 9/2004 | Takahashi et al. | 358/1.15 |
| 2004/0212826 A1 * | 10/2004 | Kashiwazaki | 358/1.15 |
| 2005/0088709 A1 * | 4/2005 | Kizaki et al. | 358/501 |
| 2005/0146731 A1 * | 7/2005 | Mitani | 358/1.1 |
| 2005/0248800 A1 * | 11/2005 | Choi | 358/1.13 |
| 2006/0023247 A1 * | 2/2006 | Yamakawa | 358/1.14 |
| 2006/0053148 A1 * | 3/2006 | Tamai et al. | 707/102 |
| 2006/0061802 A1 * | 3/2006 | Ogura | 358/1.15 |
| 2006/0066913 A1 * | 3/2006 | Nakashima | 358/448 |
| 2006/0075460 A1 * | 4/2006 | Anegawa et al. | 726/1 |
| 2007/0070416 A1 * | 3/2007 | Nakamura | 358/1.15 |
| 2008/0095447 A1 * | 4/2008 | Fukuyama et al. | 382/209 |
| 2009/0123075 A1 * | 5/2009 | Yamazaki | 382/198 |
| 2009/0201515 A1 * | 8/2009 | Kiuchi | 358/1.2 |

FOREIGN PATENT DOCUMENTS

| | | |
|---|---|---|
| JP | 11-284820 | 10/1999 |
| JP | 11-296324 | 10/1999 |
| JP | 11-298730 | 10/1999 |
| JP | 2000-108468 | 4/2000 |
| JP | 2000-222437 | 8/2000 |
| JP | 2000-350129 | 12/2000 |
| JP | 2001-350606 | 12/2001 |
| JP | 2002-182871 | 6/2002 |
| JP | 2002-278744 | 9/2002 |
| JP | 2003-296059 | 10/2003 |
| JP | 2003-348506 | 12/2003 |
| KR | 2001-0075999 | 8/2001 |
| KR | 2003-0077005 | 9/2003 |

* cited by examiner

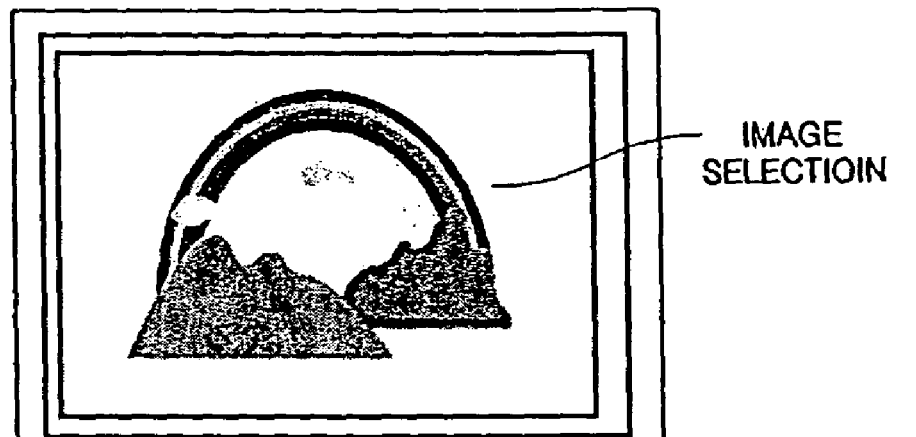
FIG. 7A — IMAGE SELECTIOIN
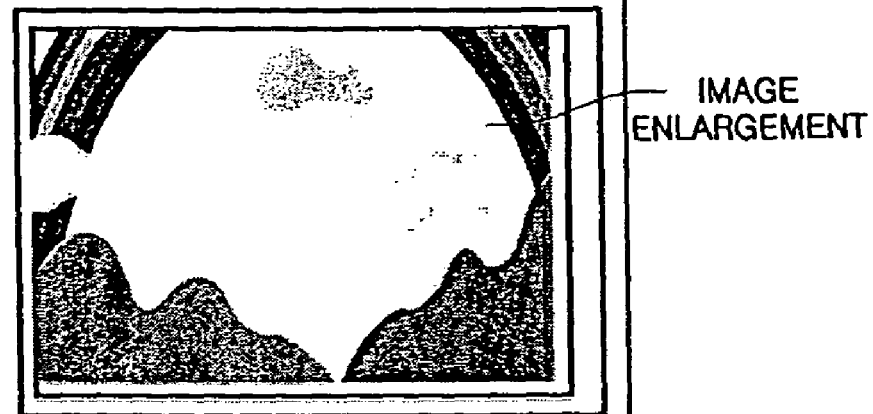
FIG. 7B — IMAGE ENLARGEMENT
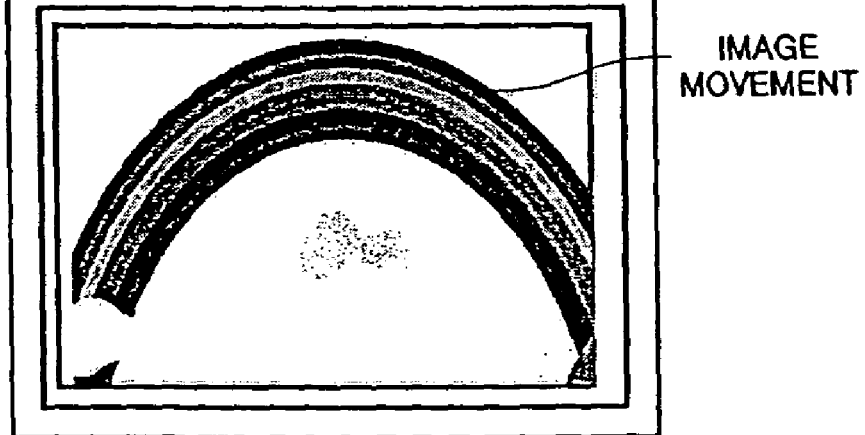
FIG. 7C — IMAGE MOVEMENT

FIG. 10

| | Image Processing Application Journal | | | |
|---|---|---|---|---|
| No. | Image Name | Date&Time | Application | Value |
| 1 | picnic0405 | 2004-04-08 | Brightness<br>Sharpen | 45<br>20 |
| 2 | memory11 | 2004-07-07 | Frame1<br>Brightness | 12 |
| 3 | Birthday02 | 2004-12-10 | Frame3<br>Vivid<br>Brightness | 03<br>20 |
| | | ⋮ | | |

IMAGE REPRINTING APPARATUS AND METHOD

CROSS-REFERENCE TO RELATED APPLICATIONS

This application claims the priority of Korean Patent Application No. 2004-34382, filed on May 14, 2004 and 2004-58847, filed on Jul. 27, 2004 in the Korean Intellectual Property Office, the disclosure of which is incorporated herein in its entirety and by reference.

BACKGROUND OF THE INVENTION

1. Field of the Invention

The present general inventive concept relates to a printer, and more particularly, to an image reprinting apparatus and method.

2. Description of the Related Art

A conventional method of printing an image using a photoprinter is as follows. A photoprinter reads a memory unit where an original image is stored and retrieves the original image. The original image is displayed on a display, and a user processes the original image into a desired image. For example, a user may adjust the contrast or brightness of the original image, enlarge, reduce, or move the original image, or change the tone of the original image while looking at the original image on the display. Once the original image is processed into an image desired by the user, the desired image is printed.

After a certain period of time, when the user desires to re-print the desired image that has already been printed, the user must reconnect the memory unit where the original image is stored to the photoprinter, retrieve the original image, and process the original image into the desired image again.

However, it is difficult to process the original image into the desired image exactly as it was printed the first time. Further, if complicated image-processing was involved previously, it takes a lot of time and effort for the user to produce the same image.

SUMMARY OF THE INVENTION

The present general inventive concept provides an image reprinting apparatus and method of a printer, in which it is possible to store information regarding the processing of an image and display the image as it was processed previously when a user desires to reprint an image that has been printed before, thereby enabling the user to reprint the image without reprocessing the image.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing an image reprinting apparatus of a printer. The apparatus includes an image-processing information storage unit storing processing information of an image when the image is processed; a print history search unit searching the image-processing information storage unit to determine whether an input image has been printed before; a display unit processing the input image based on previous processing information of the input image if the print history search unit determines that the input image has been printed before and displaying the processed image; and an image-printing unit printing the displayed image.

The image-processing information storage unit may also store information regarding the reprocessing of the displayed image when the image displayed on the display unit is reprocessed and printed. The image-processing information storage unit may store image-processing information and image file information containing at least one of a file name, a file creation date, and a file size of an image.

The apparatus may further include a user interface providing an output menu of an image-processing journal that includes additional image information stored in the image-processing information storage unit and image-processing information; and an image-processing journal output unit outputting the image-processing journal according to an output option selected by a user from the user interface.

The output menu provided by the user interface includes a "Display" option to display the image-processing journal; a "Print" option to print the image-processing journal; and a "Create File" option to create the image-processing journal as a file. The image-processing journal output unit may display the image-processing journal if the "Display" option is selected, print the image-processing journal if the "Print" option is selected, and create a file for the image-processing journal if the "Create File" option is selected.

The print history search unit may compare at least one of the file name, the file creation date, and the file size of the input image with file names, file creation dates and file sizes stored in the image-processing information storage unit to determine whether the input image has been printed before. The image-processing information may include at least one of resolution, image enlargement/reduction, image contrast information, image brightness information, image position information, and selected frame information.

The image-processing information storage unit may include an image index unit storing indexes of image-processing information; and an image-processing information list linked to each of the indexes stored in the image index unit and storing the image-processing information.

The apparatus may further include a determiner determining whether the user chooses to print the displayed image that was processed based on the previous processing information. The image-printing unit may print the displayed image if the determiner determines that the user chooses to print the displayed image. The apparatus may be installed in the printer or in a host computer that is connected to the printer.

The foregoing and/or other aspects and advantages of the present general inventive concept may also be achieved by providing an image reprinting method used by a printer. The method includes storing processing information of an image in an image-processing information storage unit when the image is processed and printed; searching the image-processing information storage unit to determine whether an input image has been printed before; processing the input image based on previous processing information of the input image if the input image is determined to have been printed before and displaying the processed image; and printing the displayed image.

The method may further include providing image file information containing at least one of a file name, a file creation date, and a file size of an image, and image-processing information including at least one of resolution, image enlargement/reduction, image contrast information, image brightness information, image position information, and selected frame information; and outputting an image-processing journal according to an option selected by a user from an output menu.

The output menu may include at least two of a "Display" option to display the image-processing journal, a "Print" option to print the image-processing journal, and a "Create File" option to create a file for the image-processing journal, and the outputting of the image-processing journal comprises displaying the image-processing journal if the "Display" option is selected, printing the image-processing journal if the "Print" option is selected, and creating a file for the image-processing journal if the "Create File" option is selected.

The providing of the image file information and the image-processing information may include displaying a predetermined image; processing the displayed image and printing the processed image; and storing processing information of the printed image in the image-processing information storage unit.

The searching of the image processing information storage unit may include searching the image-processing information storage unit to determine whether at least one of the file name, the file creation date, and the file size of the input image matches at least one of the file names, file creation dates and file sizes stored in the image-processing information storage unit.

The processing of the input image and the displaying of the processed image may further include reprocessing the displayed image, and the printing of the displayed image may further include storing reprocessing information of the displayed image in the image-processing information storage unit.

The method may further include determining whether the user chooses to print the displayed image after the displaying of the processed image and before the printing of the displayed image. The displaying of the processed image and the printing of the displayed image may include printing the displayed image if it is determined that the user desires to print the displayed image.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 7A is an image selected by a user; FIGS. 7B and 7C are images obtained as a result of image-processing information, i.e., image enlargement/movement, input by the user;

FIG. 10 illustrates an example of the image-processing journal.

DETAILED DESCRIPTION OF THE PREFERRED EMBODIMENTS

Figure 1:
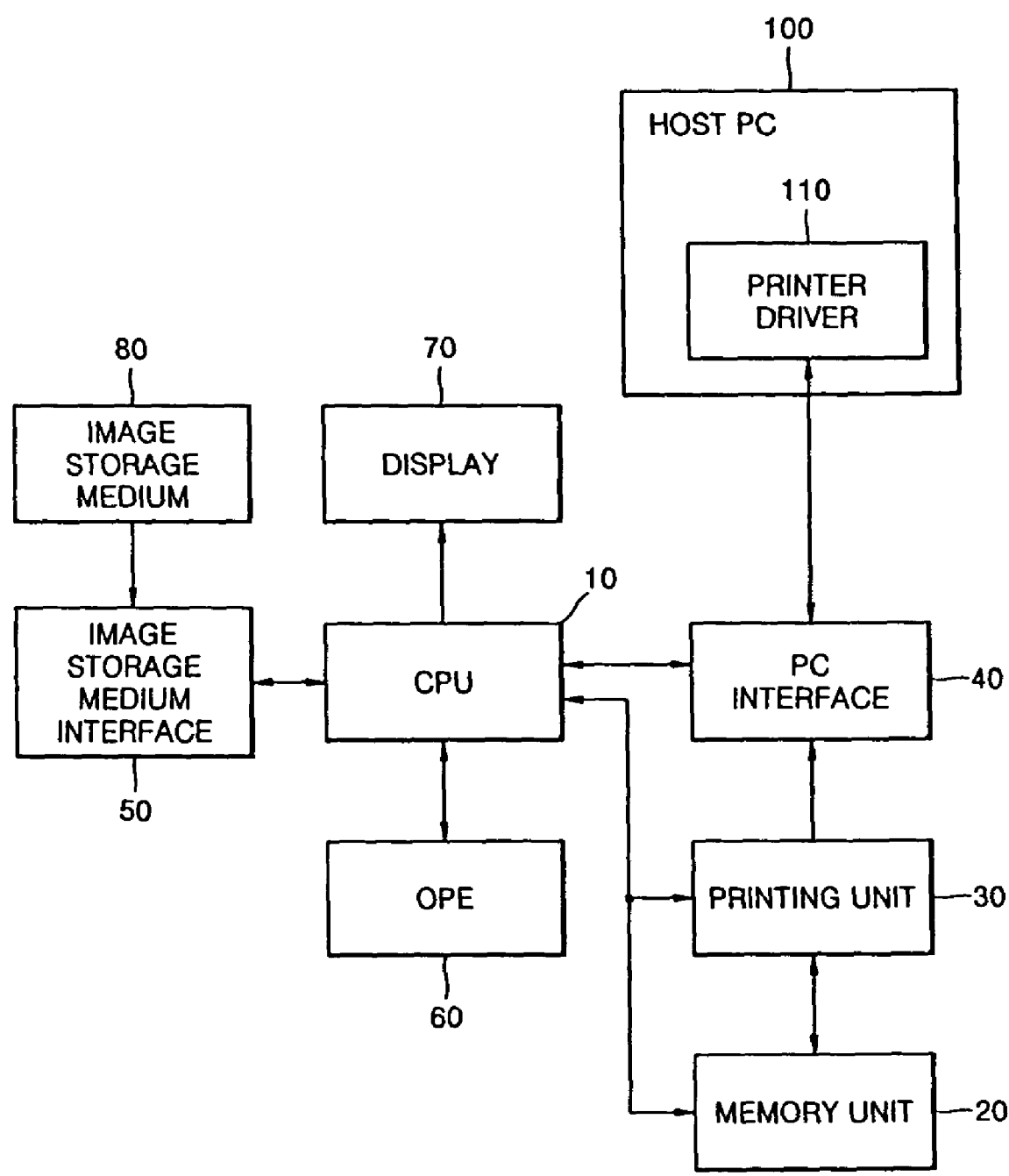
FIG. 1 is a block diagram of a photoprinter including an image-reprinting apparatus, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of a photoprinter including an image-reprinting apparatus according to an embodiment of the present general inventive concept. Referring to FIG. 1, the photoprinter includes a CPU 10, a memory unit 20, a printing unit 30, a PC interface 40, an image storage medium interface 50, an operating panel (OPE) 60, a display 70, and an image storage medium 80.

The CPU 10 controls the photoprinter according to set programs. The memory unit 20 stores operation programs and general control programs of the CPU 10 as well as data created by the CPU 10 as a result of executing programs. The printing unit 30 prints data stored in the image storage medium 80 or data transmitted to a printer driver 110 of a host PC 100.

The PC interface 40 transmits data in the host PC 100 to the printing unit 30 using the printer driver 110 such that the printing unit 30 can print the data. The OPE 60 includes a plurality of keys. When a key is pressed, the OPE 60 transmits data related to the key to the CPU 10. The display 80 receives an image and displays the image on an LCD at the command of the CPU 10.

The image storage medium interface 50 reads data stored in the image storage medium 80 and transmits the data to the display 70 at the command of the CPU 10. In addition, the image storage medium interface 50 reads an image from the image storage medium 80 and transmits the image to the printing unit 30.

Figure 2:
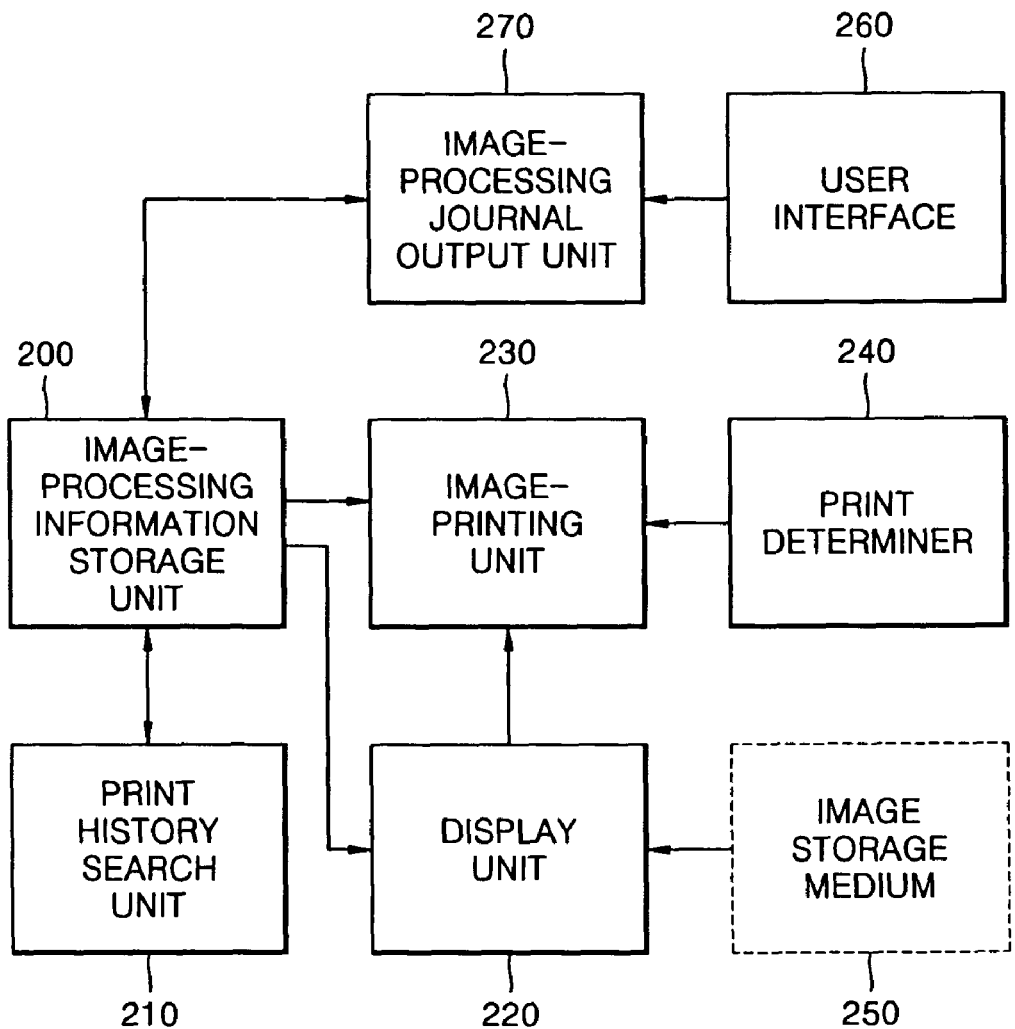
FIG. 2 is a block diagram of an image-reprinting apparatus, according to an embodiment of the present general inventive concept.

FIG. 2 is a block diagram of an image-reprinting apparatus according to an embodiment of the present general inventive concept. The image-reprinting apparatus includes an image-processing information storage unit 200, a print history search unit 210, a display unit 220, an image-printing unit 230, and a print determiner 240. The image-reprinting apparatus may further include a user interface 260 and an image-processing journal output unit 270.

Figure 3:
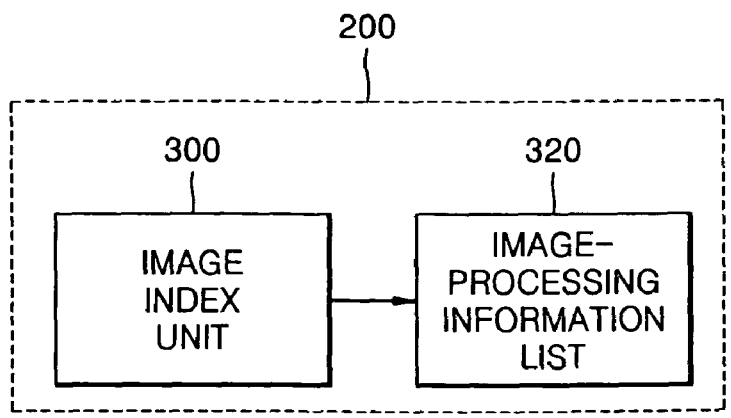
FIG. 3 is a detailed block diagram of an image-processing information storage unit illustrated in FIG. 2.

The image-processing information storage unit 200 stores information regarding the processing of an image when the image is processed and printed. As illustrated in FIG. 3, the image-processing information storage unit 200 may include an image index unit 300 and an image-processing information list 320. The image index unit 300 indexes image-processing information. The image-processing information list 320 is linked to each of the indexes of the image index unit 300 and stores image-processing information.

Figure 4:
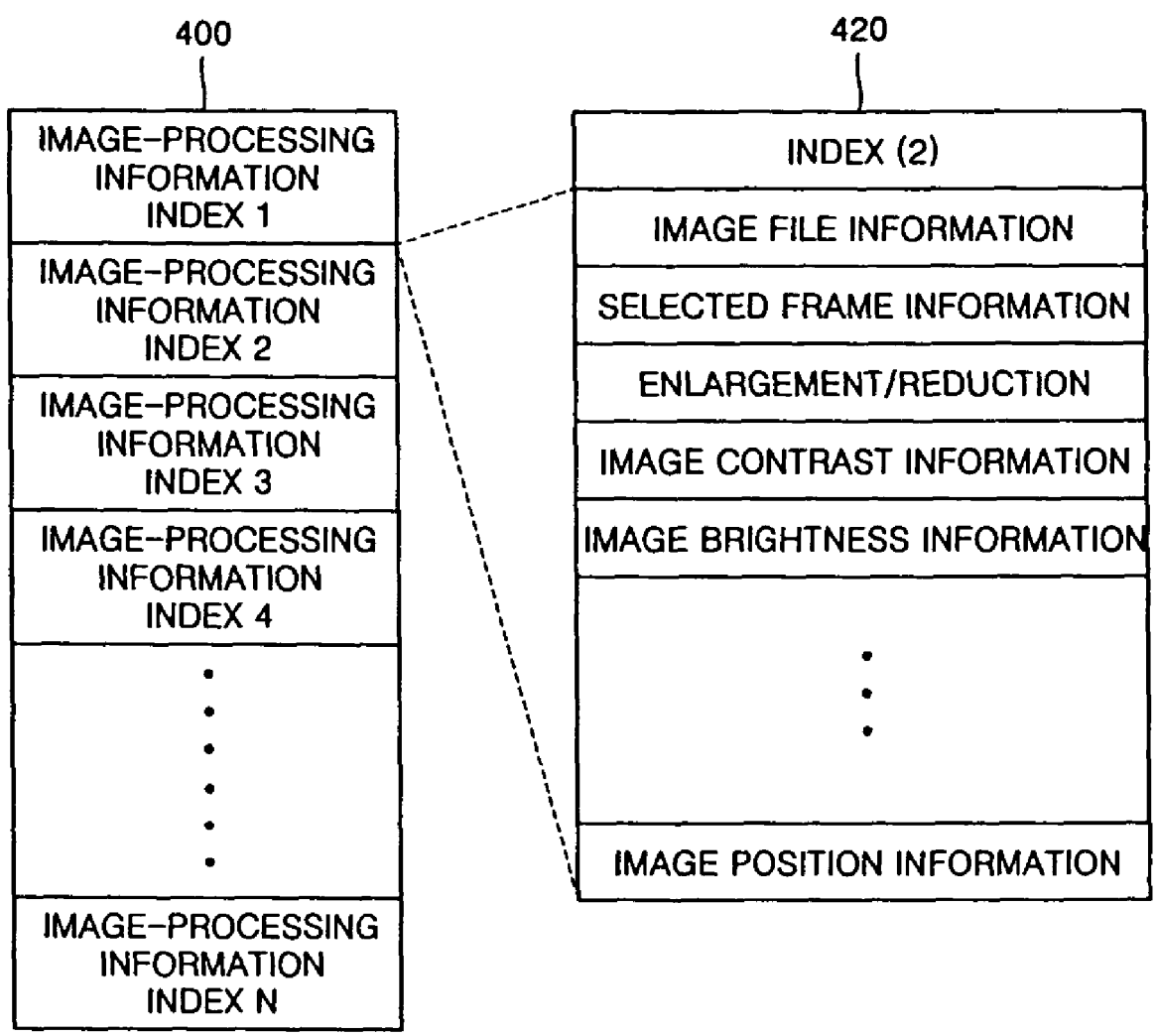
FIG. 4 illustrates an image index unit and an image-processing information list illustrated in FIG. 3 in detail.

FIG. 4 illustrates in detail and example of an image index unit 300 and an image-processing information list 320 illustrated in FIG. 3. Referring to FIG. 4, an image index unit 400 stores a list of first through Nth image-processing information indexes. An image-processing information list 420 includes specific image file information and image-processing information for each index. The image file information may include information needed to identify an image file, such as a filename, a file generation date, and a file size. The image-processing information may include resolution, information regarding a selected frame, image enlargement/reduction, and the contrast, brightness and position of an image. A set value of the image-processing information can be changed, and the changed set value can be stored in the image-processing information storage unit 200. Therefore, the image-processing information storage unit 200 can store image-reprocessing information when an image is reprocessed and printed.

When an image is input, the print history search unit 210 (FIG. 2) searches the image-processing information storage unit 200 to determine whether the image has been printed before. The image can be input by reading the image from the image storage medium 250.

If the print history search unit 210 determines that the image has been printed before, the display unit 220 processes the image using previous image-processing information and displays the processed image.

The print determiner 240 determines whether a user desires to print the image as displayed on the display unit 220.

The user interface 260 provides a user with an image-processing journal output menu stored in the image-processing information storage unit 200. The image-processing journal includes the image file information and the image-processing information.

Figure 9:
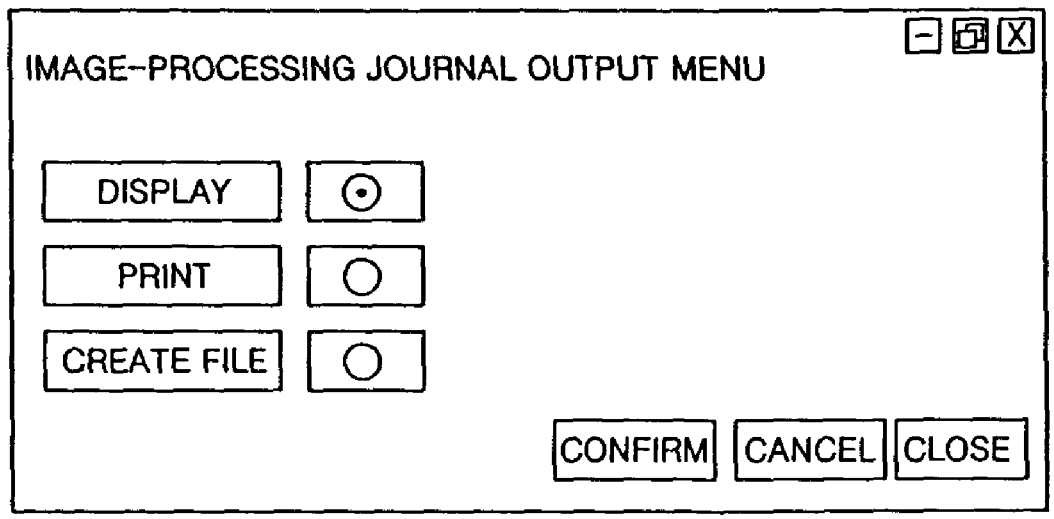
FIG. 9 illustrates an example of an output menu of a user interface.

Referring to FIG. 9, the output menu of the user interface 260 may include at least two of a "Display" option to display the image-processing journal, a "Print" option to print the image-processing journal, and a "Create File" option to create a file for the image-processing journal.

The image-processing journal output unit 270 outputs an image-processing journal according to an output option selected by a user in the user interface 260. In other words, if a user selects the "Display" option, the image-processing journal output unit 270 displays the image-processing journal. If the user selects the "Print" option, the image-processing journal output unit 270 prints the image-processing journal. If the user selects the "Create File" option, the image-processing journal output unit 270 creates a file for the image-processing journal.

The image-printing unit 230 prints an image based on information regarding the previous processing of the image if a user chooses to reprint the image through the print determiner 240.

Figure 5:
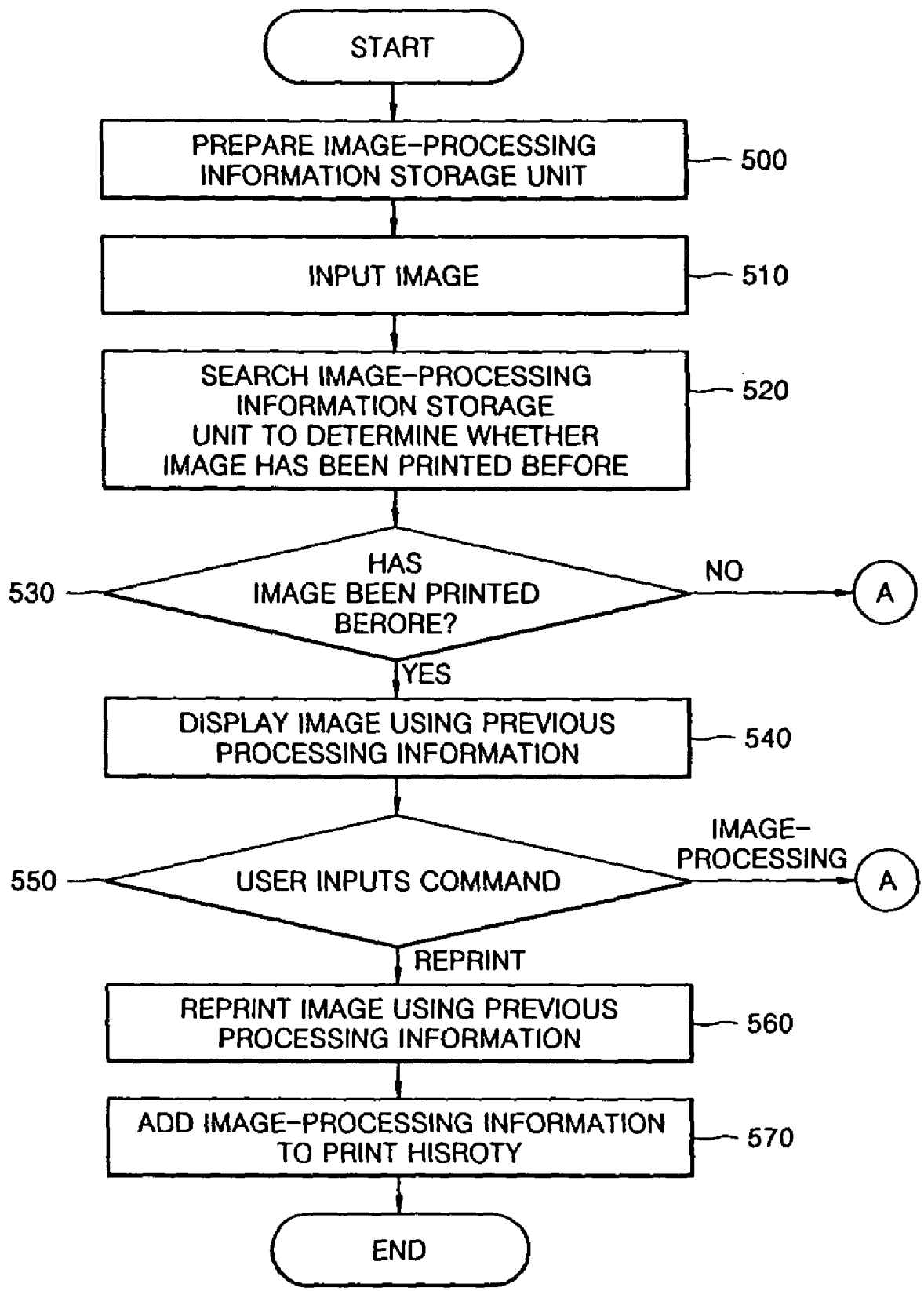
FIG. 5 is a flowchart illustrating a method of reprinting an image using a printer, according to an embodiment of the present general inventive concept.

FIG. 5 is a flowchart illustrating a method of reprinting an image using a printer, according to an embodiment of the present general inventive concept. The operation of the image-reprinting apparatus included in the photoprinter and the method of printing an image will now be described.

Figure 6:
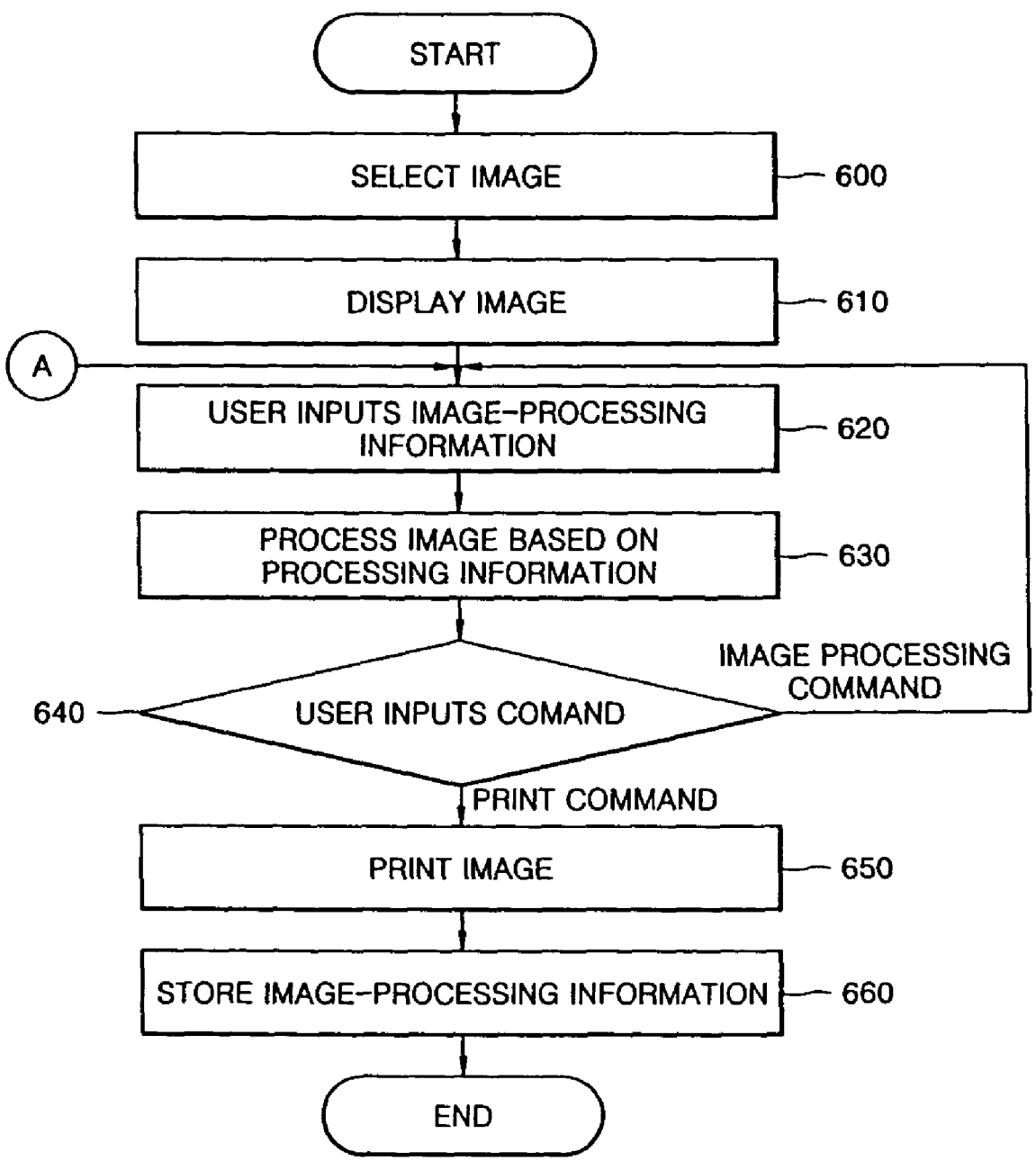
FIG. 6 is a flowchart illustrating a method of preparing the image-processing information storage unit, according to an embodiment of the present general inventive concept.

An image-processing information storage unit 200 in which image-processing information is stored is prepared (operation 500). The image-processing information storage unit 200 can be prepared according to a method illustrated in FIG. 6. Referring to FIG. 6, when a user selects an image to process (operation 600), the image is displayed on a screen (operation 610). While looking at the image displayed on the screen, the user inputs desired image-processing information (operation 620). Then, the image is processed based on the image-processing information input by the user (operation 630). When the image is processed, the processed image is displayed. If the user desires to print the processed image (operation 640), the processed image is printed (operation 650). Then, the image-processing information is stored in the image-processing information storage unit (operation 660).

If the user desires to process the processed image again (operation 640), operation 620 is re-performed. That is, the user inputs new image-processing information. When the processed image is reprocessed, image-reprocessing information can be stored. In other words, after an image is processed, the processed image is printed and displayed based on stored image-processing information. Then, when the processed image is reprocessed, image-reprocessing information can be stored.

FIG. 7 illustrates results of image processing. Specifically, FIG. 7A is an image selected by a user. FIGS. 7B and 7C are images obtained as a result of image-processing information, i.e., image enlargement/movement, input by the user.

Referring back to FIG. 5, while the image-processing information storage unit 200 is prepared, when an image is input (operation 510), for example, when an image is input from an image storage medium 250, the image-processing information is read from the image processing information storage unit to determine whether the image has been printed before (operation 520). The image storage medium 250 may be a recording medium, such as a memory card or a flash memory, on which images can be recorded. If the image was printed before (operation 530), the image is processed based on previous image-processing information and displayed (operation 540). While viewing the displayed image, the user decides whether to print the displayed image or process the displayed image (operation 550).

If the user decides to print the displayed image, the displayed image is printed (operation 560), and the image-processing information is added to a print history (operation 570). If the user decides to process the displayed image, the user inputs image-processing information in operation 620 (FIG. 6) and reprocesses the displayed image. When the reprocessed image is displayed and printed, reprocessing information regarding the reprocessed image is stored in the image-processing information storage unit 200. Whether the user desires to print the displayed image may be determined before printing the displayed image.

If the image has not been printed before (operation 530), the user inputs image-processing information (operation 620 of FIG. 6). Then, the image is processed based on the image-processing information.

Figure 8:
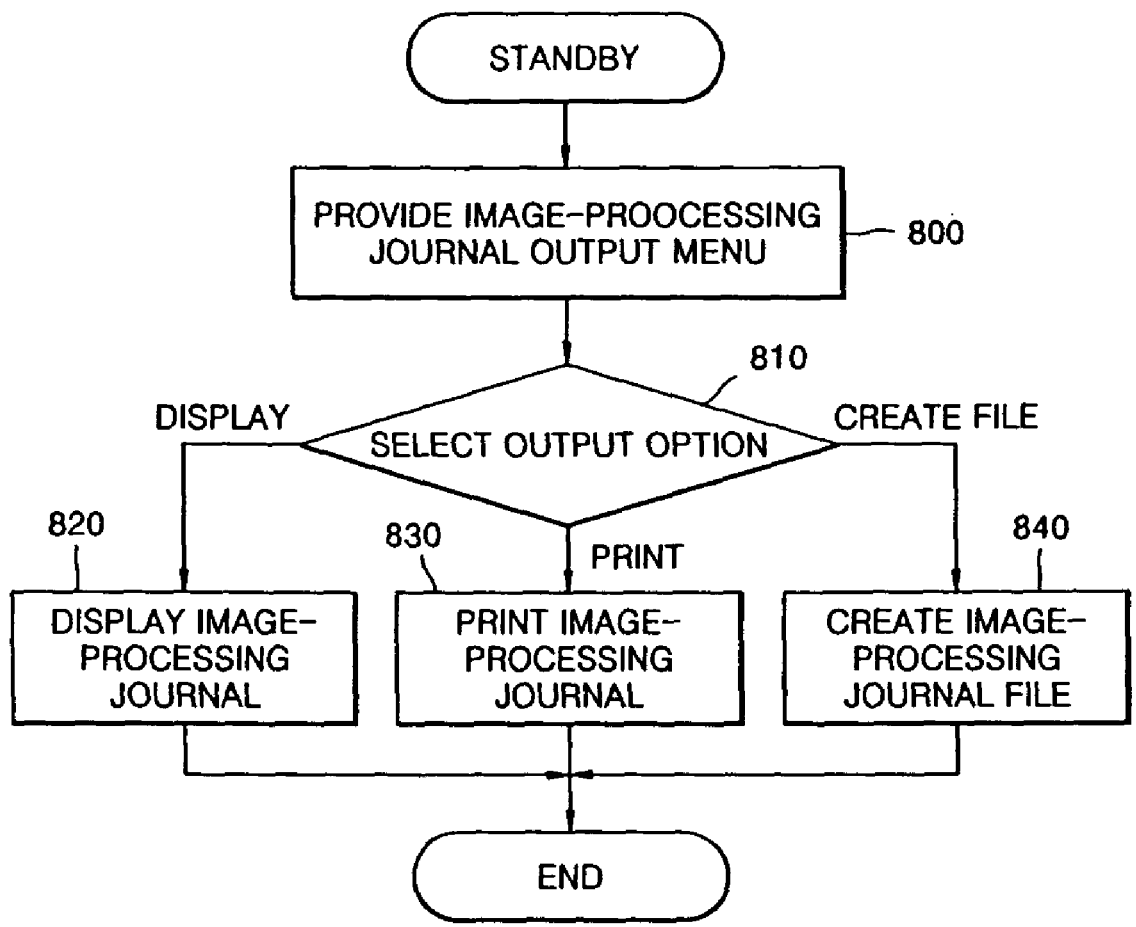
FIG. 8 is a flowchart illustrating a process of outputting an image-processing journal.

FIG. 8 is a flowchart illustrating a process of outputting the image-processing journal. Referring to FIG. 8, if the image-processing journal output menu is provided by the user interface 260 (operation 800), the user selects an output option (operation 810). As illustrated in FIG. 9, the output menu includes the "Display" option, the "Print" option, and the "Create File" option.

If the user selects the "Display" option, the image-processing journal output unit 270 displays the image-processing journal (operation 820). If the user selects the "Print" option, the image-processing journal output unit 270 prints the image-processing journal (operation 830). FIG. 10 illustrates an example of the image-processing journal. If the user selects the "Create File" option, the image-processing journal output unit 270 creates a file for the image-processing journal (operation 840).

The image reprinting apparatus and method according to various embodiments of the present general inventive concept may be included in and used by a printer, and preferably, a photoprinter. In addition, the reprinting apparatus can be included in a host computer that is connected to the printer.

The present general inventive concept can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices.

In an image reprinting apparatus and method of a printer according to various embodiments of the present general inventive concept, information regarding the processing of an image is stored. When a user desires to reprint an image that has been printed before, the image is displayed as it was processed previously. Therefore, the user can reprint the image without reprocessing the image, which enhances user convenience.

Further, a user can view an image-processing journal displayed on an LCD or printed on a sheet of paper. Hence, there is no need for a user to remember items that the user has processed before. Moreover, when an image-processing setting is incorrect, it can be corrected easily by looking at the image-processing journal, which also enhances user convenience.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A printer including an image reprinting apparatus, the printer comprising:
   an image-processing information storage unit to store image processing information of an image when the image is processed;
   a print history search unit to search the image-processing information storage unit to determine whether an input image has been printed before;
   a display unit to process the input image based on previous image processing information of the input image if the print history search unit determines that the input image has been printed before and to display the processed image; and
   an image-printing unit to print the displayed image.

2. The printer of claim 1, wherein the image-processing information storage unit also stores information regarding reprocessing of the displayed image when the image displayed on the display unit is reprocessed and printed.

3. The printer of claim 2, wherein the image-processing information storage unit stores image-processing information and image file information containing at least one of a file name, a file creation date, and a file size of an image, and the print history search unit compares at least one of the file name, the file creation date, and the file size of the input image with file names, file creation dates and file sizes stored in the image-processing information storage unit to determine whether the input image has been printed before.

4. The printer of claim 3, further comprising:
   a user interface to provide an output menu of an image-processing journal that includes additional image information stored in the image-processing information storage unit and image-processing information; and
   an image-processing journal output unit to output the image-processing journal according to an output option selected by a user from the user interface.

5. The printer of claim 4, wherein the output menu provided by the user interface comprises:
   a "Display" option to display the image-processing journal;
   a "Print" option to print the image-processing journal; and
   a "Create File" option to create the image-processing journal as a file, and the image-processing journal output unit displays the image-processing journal if the "Display" option is selected, prints the image-processing journal if the "Print" option is selected, and creates a file for the image-processing journal if the "Create File" option is selected.

6. The printer of claim 2, wherein the image-processing information includes at least one of resolution, image enlargement/reduction, image contrast information, image brightness information, image position information, and selected frame information.

7. The printer of claim 2, wherein the image-processing information storage unit comprises:
   an image index unit to store indexes of image-processing information; and
   an image-processing information list linked to each of the indexes stored in the image index unit and storing the image-processing information.

8. The printer of claim 2, further comprising a determiner to determine whether the user chooses to print the displayed image that was processed based on the previous processing information, wherein the image-printing unit prints the displayed image if the determiner determines that the user chooses to print the displayed image.

9. An image reprinting method used by a printer, the method comprising:
   storing image processing information of an image in an image-processing information storage unit in the printer when the image is processed and printed;
   searching the image-processing information storage unit to determine whether an input image has been printed before;
   processing the input image based on previous image processing information of the input image if the input image is determined to have been printed before and displaying the processed image; and
   printing the displayed image.

10. The method of claim 9, further comprising:
    providing image file information containing at least one of a file name, a file creation date, and a file size of an image, and image-processing information including at least one of resolution, image enlargement/reduction, image contrast information, image brightness information, image position information, and selected frame information; and
    outputting an image-processing journal according to an option selected by a user from an output menu.

11. The method of claim 10, wherein the output menu comprises at least two of a "Display" option to display the image-processing journal, a "Print" option to print the image-processing journal, and a "Create File" option to create a file for the image-processing journal, and the outputting of the image-processing journal comprises displaying the image-processing journal if the "Display" option is selected, printing the image-processing journal if the "Print" option is selected, and creating a file for the image-processing journal if the "Create File" option is selected.

12. The method of claim 9, wherein the providing of the image file information and the image-processing information comprises:
    displaying a predetermined image;
    processing the displayed image and printing the processed image; and
    storing processing information of the printed image in the image-processing information storage unit.

13. The method of claim 9, wherein the searching of the image processing information storage unit comprises searching the image-processing information storage unit to determine whether at least one of the file name, the file creation date, and the file size of the input image matches at least one of the file names, file creation dates and file sizes stored in the image-processing information storage unit.

14. The method of claim 9, wherein the processing of the input image and the displaying of the processed image further comprises reprocessing the displayed image, and the printing of the displayed image further comprises storing reprocessing information of the displayed image in the image-processing information storage unit.

15. The method of claim 9, further comprising determining whether the user chooses to print the displayed image after the displaying of the processed image and before the printing of the displayed image, wherein the displaying of the processed image and the printing of the displayed image comprises printing the displayed image if it is determined that the user desires to print the displayed image.

16. The method of claim 14, further comprising determining whether the user chooses to print the displayed image after the displaying of the processed image and before the printing of the displayed image, wherein the displaying of the processed image and the printing of the displayed image comprises printing the displayed image if it is determined that the user desires to print the displayed image.

17. A computer-readable recording medium containing code providing image reprinting method used by a printer, the method comprising:
   storing image processing information of an image in an image-processing information storage unit in the printer when the image is processed and printed;
   searching the image-processing information storage unit to determine whether an input image has been printed before;
   processing the input image based on previous image processing information of the input image if the input image is determined to have been printed before and displaying the processed image; and
   printing the displayed image.

18. The computer-readable recording medium of claim 17, wherein the method further comprises:
   providing image file information containing at least one of a file name, a file creation date, and a file size of an image, and image-processing information including at least one of resolution, image enlargement/reduction, image contrast information, image brightness information, image position information, and selected frame information; and
   outputting an image-processing journal according to an option selected by a user from an output menu.

19. A printer including an image re-printing apparatus the printer comprising:
   a storage unit to store image processing information of an image when the image is processed;
   a print history search unit to determine whether an input image has been printed before based on image processing information stored in the storage unit;
   a display unit to process an input image based on any previous image processing information of the input image stored in the storage unit and to display the processed image with respect to previous image processing information; and
   an image-printing unit to print the displayed image.

20. The printer of claim 19, wherein the storage unit also stores information regarding reprocessing of the displayed image when the image displayed on the display unit is reprocessed and printed.

21. The printer of claim 20, wherein the storage unit stores image-processing information and image file information containing at least one of a file name, a file creation date, and a file size of an image, and the display unit compares at least one of the file name, the file creation date, and the file size of the input image with file names, file creation dates and file sizes stored in the storage unit to determine whether the input image has been printed before.

22. The printer of claim 21, further comprising:
   a user interface to provide an output menu of an image-processing journal that includes additional image information stored in the storage unit and image-processing information; and
   an image-processing journal output unit to output the image-processing journal according to an output option selected by a user from the user interface.

23. The printer of claim 22, wherein the output menu provided by the user interface comprises:
   a "Display" option to display the image-processing journal;
   a "Print" option to print the image-processing journal; and
   a "Create File" option to create the image-processing journal as a file, and the image-processing journal output unit displays the image-processing journal if the "Display" option is selected, prints the image-processing journal if the "Print" option is selected, and creates a file for the image-processing journal if the "Create File" option is selected.

24. An image re-printing method used by a printer, the method comprising:
   storing image processing information of an image in a storage unit of the printer when the image is processed and printed;
   determining whether an input image has been printed before and processing the input image based on any previous image processing information of the input image and displaying the processed image with respect to previous image processing information; and
   printing the displayed image.

25. The method of claim 24, further comprising:
   providing image file information containing at least one of a file name, a file creation date, and a file size of an image, and image-processing information including at least one of resolution, image enlargement/reduction, image contrast information, image brightness information, image position information, and selected frame information; and
   outputting an image-processing journal according to an option selected by a user from an output menu.

26. The method of claim 25, wherein the output menu comprises at least two of a "Display" option to display the image-processing journal, a "Print" option to print the image-processing journal, and a "Create File" option to create a file for the image-processing journal, and the outputting of the image-processing journal comprises displaying the image-processing journal if the "Display" option is selected, printing the image-processing journal if the "Print" option is selected, and creating a file for the image-processing journal if the "Create File" option is selected.

27. The method of claim 24, wherein the providing of the image file information and the image-processing information comprises:
   displaying a predetermined image;
   processing the displayed image and printing the processed image; and
   storing processing information of the printed image in the storage unit.

28. The method of claim 24, wherein the processing an input image based on any previous processing information of the input image comprises searching the storage unit to determine whether at least one of the file name, the file creation date, and the file size of the input image matches at least one of the file names, file creation dates and file sizes stored in the image-processing information storage unit.

29. The method of claim 24, wherein the processing of the input image and the displaying of the processed image further comprises re-processing the displayed image, and the printing of the displayed image further comprises storing re-processing information of the displayed image in the storage unit.

30. The method of claim 24, further comprising determining whether the user chooses to print the displayed image after the displaying of the processed image and before the printing of the displayed image, wherein the displaying of the processed image and the printing of the displayed image comprises printing the displayed image if it is determined that the user desires to print the displayed image.

31. The method of claim 29, further comprising determining whether the user chooses to print the displayed image after the displaying of the processed image and before the printing of the displayed image, wherein the displaying of the processed image and the printing of the displayed image comprises printing the displayed image if it is determined that the user desires to print the displayed image.

32. An image reprinting apparatus of a printer, the apparatus comprising:
  a memory unit to store a first image processing information of an input image when the input image is processed; and
  a processing unit to determine whether the input image has been previously printed, to process the input image based on the first image processing information when the input image has been previously printed, and to output a signal representing the processed input image.

33. An image reprinting apparatus comprising:
  a storage unit;
  a controller to receive and process a first input image, to generate image processing information representing the processed first input image and to store the image processing information in the storage unit when the first input image is processed;
  a print history search unit to search the storage unit and determine whether a second input image corresponds to the processed and stored first input image;
  a display unit to display the second input image having the image processing information when the second input image corresponds the first input image; and
  an image-printing unit to print the displayed image.

* * * * *